(12) United States Patent
Bandhu et al.

(10) Patent No.: US 11,243,968 B2
(45) Date of Patent: Feb. 8, 2022

(54) DYNAMIC DATA SERVICE ENGINE/ROUTER FOR CONTENT SERVICE MANAGEMENT

(71) Applicant: Open Text Holdings, Inc., San Mateo, CA (US)

(72) Inventors: Gajendra Babu Bandhu, Bangalore (IN); Sharath Babu Pulumati, Telangana (IN)

(73) Assignee: OPEN TEXT HOLDINGS, INC., San Mateo, CA (US)

( * ) Notice: Subject to any disclaimer, the term of this patent is extended or adjusted under 35 U.S.C. 154(b) by 277 days.

(21) Appl. No.: 16/653,465

(22) Filed: Oct. 15, 2019

(65) Prior Publication Data
US 2021/0109942 A1    Apr. 15, 2021

(51) Int. Cl.
| | | |
|---|---|---|
| *G06F 15/16* | (2006.01) | |
| *G06F 16/25* | (2019.01) | |
| *H04L 29/08* | (2006.01) | |

(52) U.S. Cl.
CPC .......... *G06F 16/25* (2019.01); *H04L 67/1008* (2013.01); *H04L 67/327* (2013.01)

(58) Field of Classification Search
CPC .... H04L 67/1008; H04L 67/327; G06F 16/25
See application file for complete search history.

(56) References Cited

U.S. PATENT DOCUMENTS

| | | | |
|---|---|---|---|
| 2006/0224716 A1* | 10/2006 | Nakazawa .......... | H04L 67/2842 709/223 |
| 2006/0271699 A1* | 11/2006 | Lee ..................... | H04N 21/8543 709/230 |
| 2008/0208949 A1* | 8/2008 | Tanaka ............. | H04N 21/41407 709/201 |
| 2010/0120402 A1* | 5/2010 | Sethi ................... | H04L 67/1095 455/414.1 |
| 2010/0131642 A1* | 5/2010 | Chalikouras ....... | G06Q 30/0241 709/224 |
| 2011/0213655 A1* | 9/2011 | Henkin .............. | G06Q 30/0251 705/14.49 |
| 2012/0259997 A1* | 10/2012 | Liskov .................. | H04L 67/327 709/238 |
| 2012/0324581 A1* | 12/2012 | Economos, Jr. ...... | H04W 12/08 726/25 |

(Continued)

Primary Examiner — Razu A Miah
(74) Attorney, Agent, or Firm — Sprinkle IP Law Group (57) ABSTRACT

Systems, methods and products for content management where a dynamic data service layer is provided between a content server layer to route requests from various content server instances to various database instances. The dynamic data service layer maintains an instance pool of available database instances and a connection pool of available connections to each database instance. A content server instance submits a corresponding request to the dynamic data service layer, which then examines the instance pool to identify a database instance that can service the request and examines the connection pool to identify an available connection to the identified database instance. The request is submitted to the identified database instance through the identified connection, and the responsive data is stored at a memory location which is accessible by the content server instance and can be read using a starting memory address and the length of the stored data.

18 Claims, 6 Drawing Sheets

(56) References Cited

U.S. PATENT DOCUMENTS

| | | | |
|---|---|---|---|
| 2013/0151680 A1* | 6/2013 | Salinas | G06F 16/211 |
| | | | 709/223 |
| 2013/0246616 A1* | 9/2013 | Park | H04L 67/101 |
| | | | 709/224 |
| 2014/0059158 A1* | 2/2014 | Chen | H04L 29/08549 |
| | | | 709/213 |
| 2015/0134831 A1* | 5/2015 | Hiroishi | H04L 67/1008 |
| | | | 709/226 |
| 2015/0288619 A1* | 10/2015 | Fritsch | H04L 41/5025 |
| | | | 709/224 |

* cited by examiner (Prior art)
Fig. 1

DYNAMIC DATA SERVICE ENGINE/ROUTER FOR CONTENT SERVICE MANAGEMENT

TECHNICAL FIELD

This disclosure relates generally to data management, and more particularly to systems and methods for enabling content management systems to access stored information more quickly and efficiently.

BACKGROUND

Content management systems allow organizations to easily manage data such as digital content for websites, business documents, employee or customer information, or other information used in the course of their respective businesses. These content management systems may, for example, incorporate content servers that interact with database systems to enable the organization, storage and retrieval of the organizations' data in a manner that allows the organizations to ensure compliance with company policies, facilitate use of the data by employees and collaborators, increase efficiency and productivity within the organizations, capture the value of the organizations' data, and so on.

Typically, the content servers that are implemented in content management systems are tightly coupled to the databases that store and retrieve an organization's data. In other words, a particular instance of a content server is normally coupled to a single, corresponding instance of a database in a one-to-one relationship, rather than being organized in a more distributed fashion. A system may have several content servers, each of which is attached to a corresponding database instance. Each database instance is accessed only through the corresponding content server service.

This arrangement may present several problems. For example, the system could experience high levels of requests which necessitate additional content server instances and/or database instances. It may therefore be necessary or desirable to add another content server instance or database instance, but this generally cannot be done dynamically at runtime. Instead, it is necessary to stop operation of the content management system, reconfigure the content server instances and database instances as desired, and restart or resume operation of the system. This causes downtime which reduces the performance of the system.

Another problem is that, even if the current configuration of the content server instances and database instances is appropriate, the tightly coupled relationship between them may present inefficiencies in accessing the data. For instance, when a request for data is forwarded from a content server instance to the corresponding database instance, the database instance will normally stream the data to the content server instance in response to the request. The amount of data which is provided in response to the request may be very large, and streaming this data back to the content server instance may take quite a bit of time. During this data transfer, the content server instance and database instance are tied up and cannot perform any other operations until the transfer is complete.

SUMMARY

The present disclosure describes systems, methods and products for content management in which a dynamic data service layer is provided between a content server layer and a database layer in order to provide solutions to one or more of the problems mentioned above. The dynamic data service layer maintains an instance pool which is indicative of the database instances that are available to the system, and also maintains a connection pool (which may also be referred to as a service pool) that indicates the various connections that may have been established to each of the instances identified in the instance pool. When a content server instance is accessed, the content server instance submits a corresponding request to the dynamic data service layer, which then examines the instance pool to identify a database instance that can service the request. When an appropriate database instance has been identified, the connection pool is examined to identify an available connection to the database instance. The request for data is submitted to the identified database instance through the identified connection, and the responsive data is stored at a memory location which is accessible by the content server instance. After the responsive data has been provided by the database instance, the dynamic data service layer provides a response to the content server instance which identifies the memory address and the length of the stored data. The content server instance can then read the responsive data from the memory location while the dynamic data service layer and/or database instance perform other operations.

One embodiment is a system having a content server layer, a dynamic data service layer and a database layer. The content server layer has one or more content server instances, and the database layer has one or more database instances that may be of one or more different types. The dynamic data service layer is communicatively coupled between the content server layer and the database layer and is configured to monitor the database layer, identify database types which are available in the database layer, and maintain an instance pool data structure that identifies instances of the database types which are available in the database layer. The dynamic data service layer is further configured to maintain a connection pool data structure and to identify, for each of the database instances, corresponding connections to the database instances which are available to the content server instances. When the dynamic data service layer receives a request for service from the content server layer, the dynamic data service layer selects an available database instance from the instance pool data structure and selects an available connection from the connection pool data structure, and then establishes a connection between a content server in the content server layer that initiated the request and the selected database instance and connection.

In one embodiment, the dynamic data service layer includes a data service engine that maintains the instance pool and connection pool data structures, a data service search engine that is configured to search for available instances and connections in the respective pool data structures, and a health monitor that is configured to determine the health/status of the various instances and connections in the pool data structures.

In one embodiment, the dynamic data service layer is configured to receive a request for service from a database, identify a corresponding database type from the request that is capable of servicing the request, and determine whether the corresponding database type is available in the instance and connection pool data structures. The dynamic data service layer may be configured to identify an application that initiated a request and identify a corresponding database type that is capable of servicing the request. The dynamic data service layer may be configured to determine whether one or more of the available database instances contains a type of information table associated with the type of the request.

In one embodiment, the dynamic data service layer is configured to determine a load corresponding to each database instance included in the instance pool, and to select one of the available database instances based at least in part on the loads of the database instances included in the instance pool.

An alternative embodiment comprises a method for dynamically enabling communication between content server instances and database instances. This method includes executing one or more content server instances in a content server layer, executing one or more database instances in a database layer, and executing a dynamic data service layer that is coupled between the content server layer and the database layer. Executing the dynamic data service layer includes maintaining an instance pool that identifies available ones of the database instances and maintaining a connection pool that identifies available connections to the database instances identified in the instance pool. Upon receiving a request from a first one of the content server instances, the dynamic data service layer further identifies a first one of the database instances in the instance pool which is available to service the request, and identifies, in the connection pool, a first one of the connections which corresponds to the first one of the database instances, and which is available for servicing the request. The dynamic data service layer then accesses the first one of the database instances using the first one of the connections and provides the request to the first one of the database instances so that it can be serviced.

Another alternative embodiment comprises a computer program product for dynamically enabling communication between content server instances and database instances. This product comprises a non-transitory computer-readable medium which stores instructions that are executable by one or more processors to cause them to perform a method in which one or more content server instances are executed in a content server layer, one or more database instances are executed in a database layer, and a dynamic data service layer is executed, where the dynamic data service layer is coupled between the content server layer and the database layer. The instructions are further executable to maintain an instance pool that identifies available ones of the database instances, and to maintain a connection pool that identifies available connections to the database instances identified in the instance pool. The instructions are further executable to receive a request from a first one of the content server instances and identify a first one of the database instances in the instance pool which is available to service the request, as well as a first one of the connections in the connection pool which corresponds to the first one of the database instances and which is available for servicing the request. The instructions are further executable to access the first one of the database instances using the first one of the connections and to provide the request to the first one of the database instances so that it can be serviced.

Numerous alternative embodiments may also be possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

In content management system applications, content management servers are normally tightly coupled to corresponding instances of databases that contain the content which is being managed. In other words, each instance of a content management server is connected in a one-to-one relationship to a corresponding instance of a database. If it is necessary or desirable to provide another instance of a content management server or a database, it is typically necessary to bring down the entire application, reconfigure the application to incorporate the new instance(s), and then re-launch the application with the new configuration. The same is true when an instance of a content management server or database is lost—the entire application must be halted and reconfigured to allow new instances of the lost server or database to be used in place of those that were lost. This is an inefficient process and can lead to a significant amount of costly downtime.

The present systems, methods and products are designed to enable one or more content management server instances to support multiple types and instances of databases through a dynamic data service module or layer that is not constrained by the one-to-one relationships that are enforced in the prior art. Embodiments of the invention provide the dynamic data service layer between a content management server layer and a database layer, where instances of the content management server access the database instances through the dynamic data service layer. The dynamic data service layer maintains a list of database instances (and "instance pool") and a list of database servers and the respective connections (a "service pool" or "connection pool") to each of the database instances.

When a content management server needs to access a database, a request to the database is provided to the dynamic data service layer, which checks the instance pool to identify a suitable database instance and then checks the service pool to identify a connection to the database instance. The dynamic data service layer then routes the request to the identified instance and connection. The session object and the connection object would be mapped at runtime based on the database request and would route the request to the desired database in order to process the request. The dynamic data service layer can monitor the health of the database instances and connections, and can distribute the request load from the different content management servers to the database instances to ensure high availability of the database instances to the content management servers. If the load on a database instance is too high, the dynamic data service layer may be configured to provide notifications to content management server, or it may even open new instances of the database.

Figure 1:
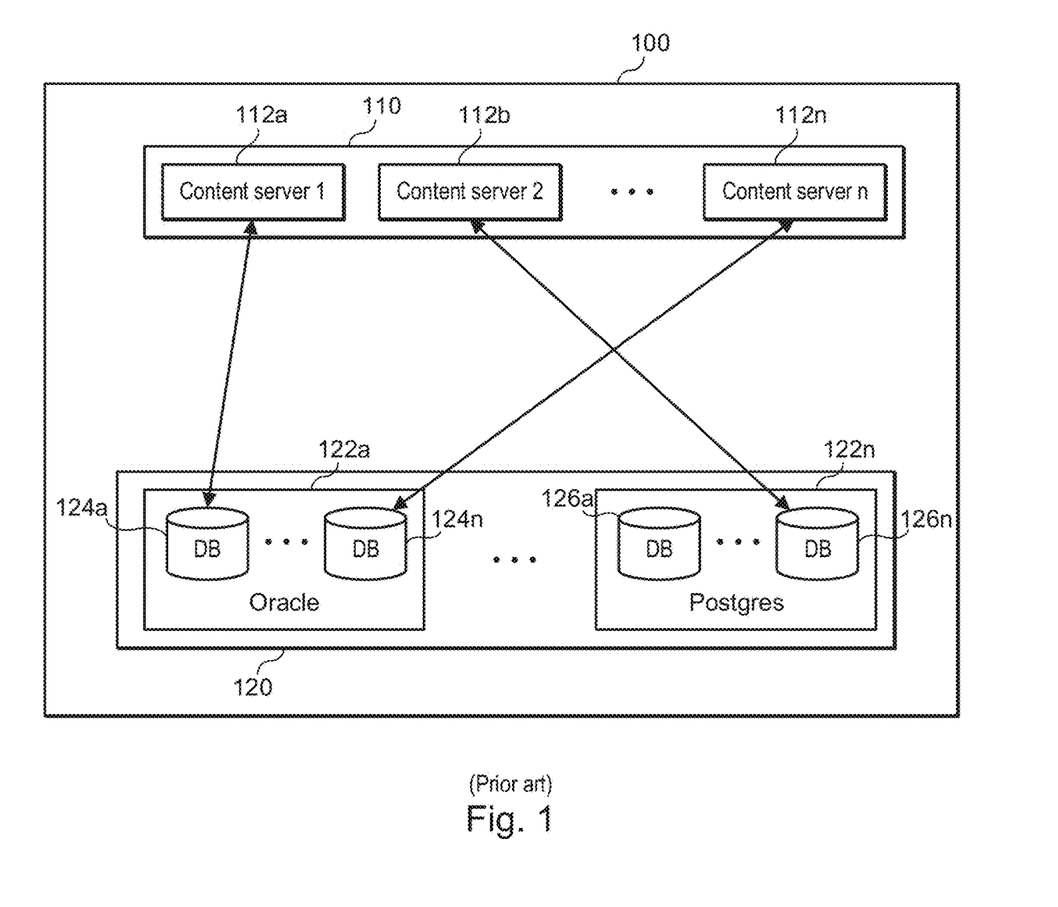
FIG. 1 is a block diagram illustrating an exemplary content management system in accordance with the prior art.

Before describing the present embodiments, it may be helpful to present an example of a prior art content management system. An example of such a system is illustrated in FIG. 1. In this system, a content management application 100 includes a content server layer 110 and a database layer 120. Content server layer 110 includes a plurality of content server instances 112, and database layer 120 includes several different types (122) of databases, where each type has several database instances (124, 126). in this example, database instances 124 are instances of an Oracle database, while database instances 126 are instances of a Postgres database. The database instances of a particular type may be identical copies of the same database, or they may be different databases of this type.

As indicated in the figure, content server instances 112 are tightly coupled to database instances 124, 126. That is, each specific content server instance is connected to a corresponding one of the database instances. Thus, if a request is submitted to a particular one of the content server instances, that request will be forwarded to the one specific database instance to which the content server instance is connected. In this particular example, content server instance 112a is connected to database instance 124a, content server instance 112b is connected to database instance 126n, and database instance 112c is connected to database instance 124n. These specific connections are configured for the application, and if it becomes necessary to update the connections (e.g., if a new content server instance or database instance needs to be added), the application must be stopped so that the connections can be reconfigured. After the reconfiguration, the application can be restarted.

As noted above, the tightly coupled relationship of the content server instances and database instances in prior art systems may present a number problems, such as the inability to dynamically reconfigure which of the content server instances are coupled to which specific database instances, which results in an inability to perform load balancing between database instances, as well as downtime that is associated with adding or removing content server or database instances, or reconfiguring content server/database relationships. The tightly coupled relationships between content server instances and database instances may also be configured to stream data from the database instance to the content server instance, which occupies the instances for a significant amount of time and prevents them from performing other operations.

Figure 2:
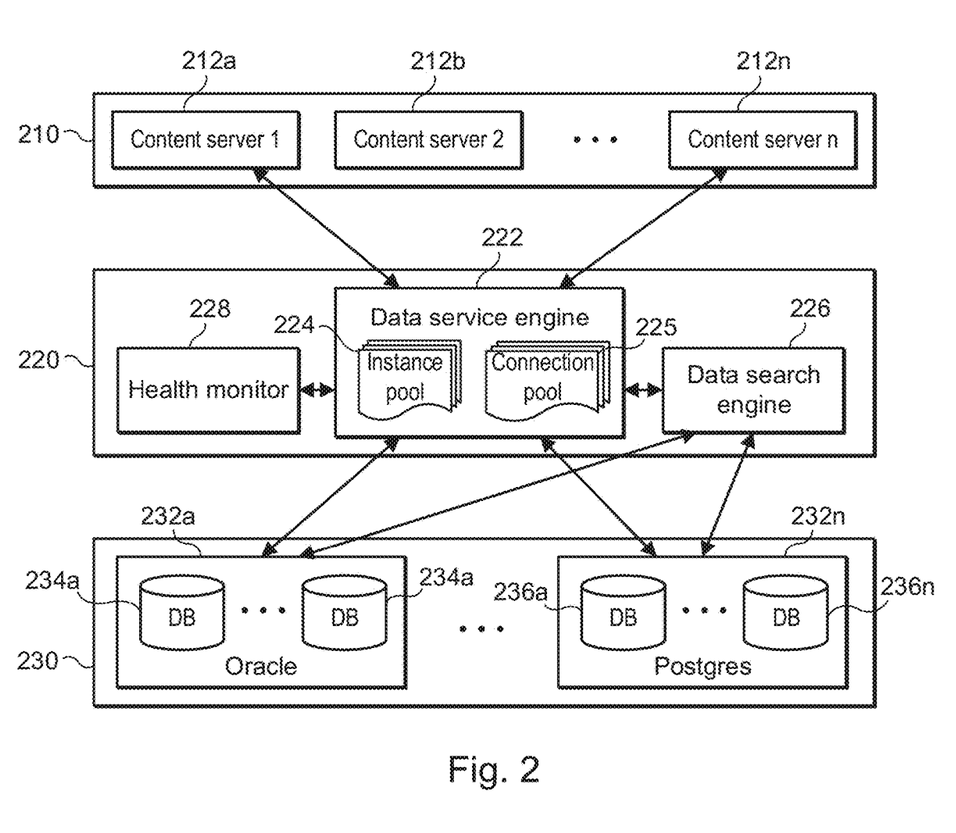
FIG. 2 is a block diagram illustrating the interconnection of content server instances and database instances using a dynamic data service layer in accordance with some embodiments.

Referring to FIG. 2, a diagram illustrating the interconnection of content server instances and database instances using a dynamic data service layer in accordance with some embodiments is shown. In this embodiment, similar to the system of FIG. 1, a content server layer 210 having one or more content server instances 212 is provided. A database layer 230 is also provided. Like the system of FIG. 1, database layer 230 may include several different types (232) of databases, where there may be one or more database instances (234, 236) of each database type.

Unlike the system of FIG. 1, the embodiment of FIG. 2 also includes a dynamic data service layer 220 which is loosely coupled between content server layer 210 and database layer 230 (using a cohesion model in which specific content server instances are decoupled from specific database instances). Dynamic data service layer 220 has a data service engine 222 which is configured to dynamically route requests from content server layer 210 to database layer 230 based on information contained in instance pool 224 and connection pool 225. Instance pool 224 is a list that is maintained by data service search engine 226. Instance pool 224 identifies the various database instances that are available in the database layer.

When a data request is received by data service engine 222 from one of the content server instances in content server layer 210, data service search engine 226 examines instance pool 224 to identify one or more database instances in database layer 230 that are available to service the request and provide the requested data. When a suitable database instance has been identified from instance pool 224, data service search engine 226 examines connection pool 225 to determine the connections to the identified database instance that are available. An appropriate one of these connections can then be selected by data service search engine 226, and this information is provided to dynamic data service engine 222, which sends the data request via the selected connection to the identified database instance.

The embodiment of FIG. 2 replaces the tightly coupled structure of prior art systems with a distributed structure that can support one or more content server instances that can access various ones of the available database instances. The instance pool and connection pool can be updated at runtime so that new instances can be added and accessed without the need to stop the application and reconfigure the connections between the content server instances and database instances. The dynamic data service layer may be configured to determine the load on each database instance (e.g., using a health monitor 228), and to route requests from the various content server instances to different ones of the database instances based on their respective loads. In this manner, the dynamic data service layer distributes the load across the database instances and maintains high availability among these instances. The data service engine may determine when particular database instances have too many requests or too great a load, and may provide notifications of these or other status events to the application layer.

As noted above, there may be multiple database instances within database layer 230, and these database instances may have different types (e.g., Oracle, Postgres, etc.). Within a given database type, some of the database instances may be replicas of each other. Multiple instances may be provided in order to allow the system to service more requests (or a greater load) than can be handled by a single instance of the database. In the event that one of the instances of a database is updated, the system will synchronize the replicas of this database instance to make them identical. It should be noted there may be database instances of a given type which are not replicas (there may be one or more identical copies of each of the different databases).

When a content server instance submits a request for an operation on a particular database, the dynamic data service engine may route the request to any one of the database instances which is a copy of this database. The dynamic data service engine may thereby perform load balancing, submitting the request to a less-loaded instance of the database. The system may split requests and direct them to particular database instances so that the requests can be directed to database instances that are capable of providing particular operations. For example, a request may be for a transaction that includes multiple steps, such as reading, writing and updating. These steps may be split into separate requests that are sent to separate database instances, with synchronization being performed between the different instances as necessary.

If needed, the dynamic data service engine can alter the usage of a database instance to a different request type in order to reduce or distribute loading on the database instances. For example, the dynamic data service engine may direct requests which involve read operations to one instance of a database and may direct requests involving write operations to a different instance of the database (with synchronization between the instances occurring at the database level). The dynamic data service engine may also split requests from a content server instance and direct separate requests to different database instances based on docbase information in the request or types of data that are requested. ("Docbase" is used herein to refer to a specific set of data, identifiable by a corresponding docbase identifier, which is associated with a particular content server instance.)

The dynamic data service engine may also launch new instances of a database when none of the existing database instances are available to process a request. The dynamic data service engine may provide a notification to a content server instance about the load of the database, either in conjunction with, or as an alternative to, launching the new database instance. In some cases, the system may have different types of content server applications which could access the database layer through the dynamic data service engine. Instances of the different content server applications could be connected to different database instances. The dynamic data service engine can direct requests from the instances of the different content server applications to respective database instances based on, e.g., the request type, type of docbase and operation required by the requests.

In some embodiments, the data service search engine in the dynamic data service layer is configured to provide service/connection validation. The data service search engine may also build details of the connections and include these details with the information in the connection pool and/or instance pool, and in connection tables and/or instance tables that are generated for the dynamic data service engine for use in routing specific requests. As noted above, the data service search engine may build the connection pool and instance pool at runtime, so that new content server instance or database instance can be added (at runtime) without affecting operations of the content management system.

It should be noted that the embodiments disclosed herein may include implementations within a multitenant environment. In such implementations, the content server instances may include tenant identifiers in requests that are provided to the dynamic data service engine in order to allow the dynamic data service engine to route the requests from the various tenants to appropriate database instances and to maintain data isolation between tenants as needed in the multitenant environment.

Figure 3:
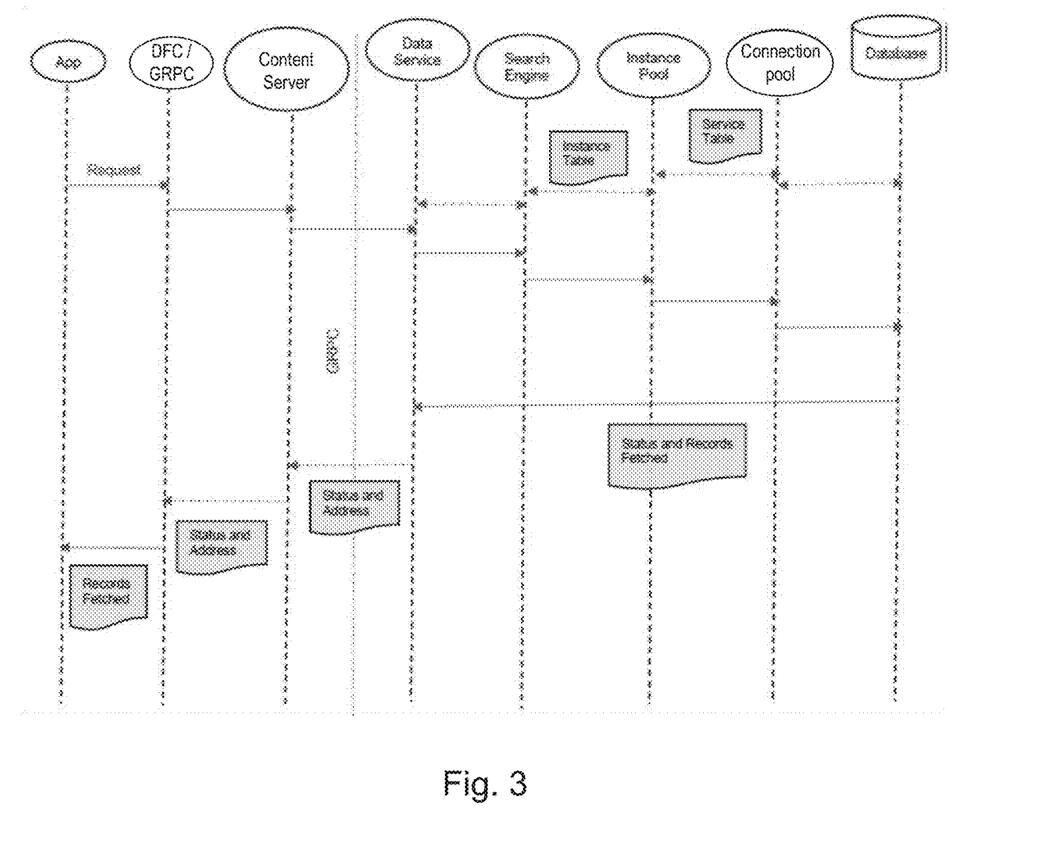
FIG. 3 is a diagram illustrating the operation of the dynamic data service layer in accordance with some embodiments.

Referring to FIG. 3, a diagram illustrating the operation of the dynamic data service layer in some embodiments is shown. As depicted in this figure, an application such as a content management application generates a request which is forwarded to a content server instance using appropriate APIs. These may include DFCs (Documentum Foundational Classes), GRPCs se (Google remote procedure calls), or the like. The content server instance in turn provides a request to the dynamic data service engine with information identifying the requested operation and data (e.g., via a query).

An exemplary request from the content server instance to the dynamic data service engine may be provided in the form of a connection object, such as:

```
Connection Object{
    Instance_Id
    SQL Query
    Instance Credentials{
        Username
        Password
    }
    is_newinstance
    txn_required
    Address_for_results
    Length_for_results
}
``` where Instance_Id is an identifier of the content server instance, SQL Query is a query to be used to search the target database instance, Instance Credentials include the username and password of an entity accessing the database instance, is_newinstance is an indicator of whether the content server instance is new, and txn_required is an indicator that the entire request flow is to be tagged as a particular transaction (if this parameter is not specified, then the request would be served as a dynamic service offering). The connection object may also specify an address at which the results of the database access will be stored (Address_for_results), as well as an allowed length of the returned data (Length_for_results).

The dynamic data service engine communicates with the data service search engine in order to identify a suitable database instance and connection for the request (the data service search engine having previously monitored the database instances and generated the instance pool and connection pool). The data service search engine then searches the instance table to identify a database instance which is appropriate to service the request and subsequently searches the connection pool to identify a suitable connection for the identified database instance. This information is provided to the dynamic data service engine.

The dynamic data service engine forwards the request to the database instance identified by the data service search engine using the connection identified by the data service search engine. In response to the request, the database instance returns any data that is responsive to the request, as well as status information for the request. The dynamic data service engine then provides the returned data and status to the content server instance. This information may be provided to the content server instance, for example, by storing the information at a memory location and then providing the starting address of the memory location and the length of the data to the content server instance.

An exemplary response from the dynamic data service engine to the content server instance may, for example, be provided in the form of a return object, such as:

```
Return Object{
Error_msg
Address_of_results
Length_of_data
Status
}
``` where Error_msg is an indicator of whether an error was encountered in the course of the database instance servicing the request, Address_of_results is the starting address at which the returned data is stored in memory, Length_of_data is the length of the returned data, and Status is an indicator of the status of the request.

After the dynamic data service engine has stored the returned data in memory and provided the return object to the content server instance, the content server instance can read the indicated amount of data from the memory, starting at the indicated address. The content server instance can then provide the requested data to the application using the DFCs, GRPCs, or some other interface mechanism.

Figure 4A:
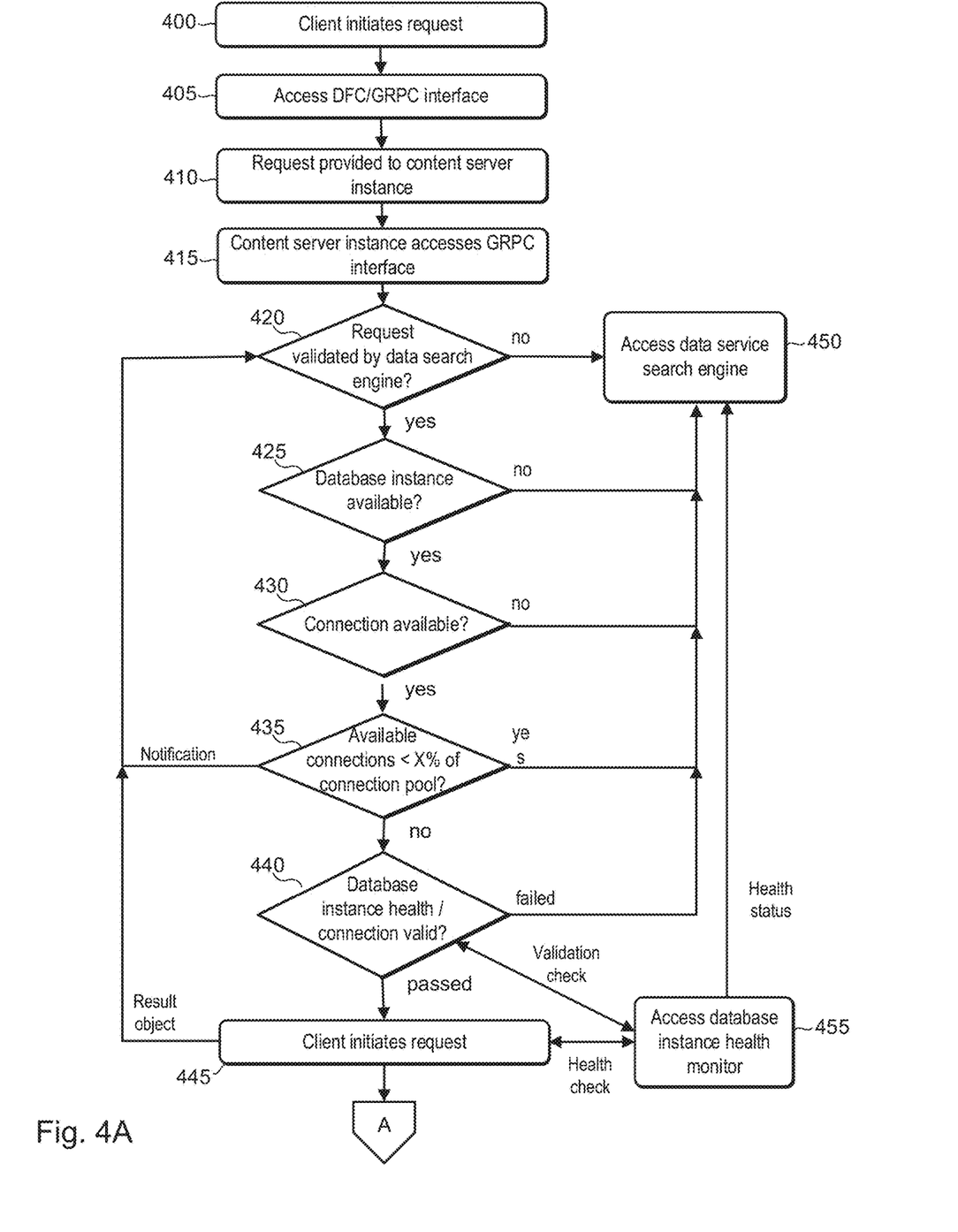
FIGS. 4A and 4B show a flow diagram illustrating an alternative perspective of the operation of the dynamic data service layer in accordance with some embodiments.
Figure 4B:
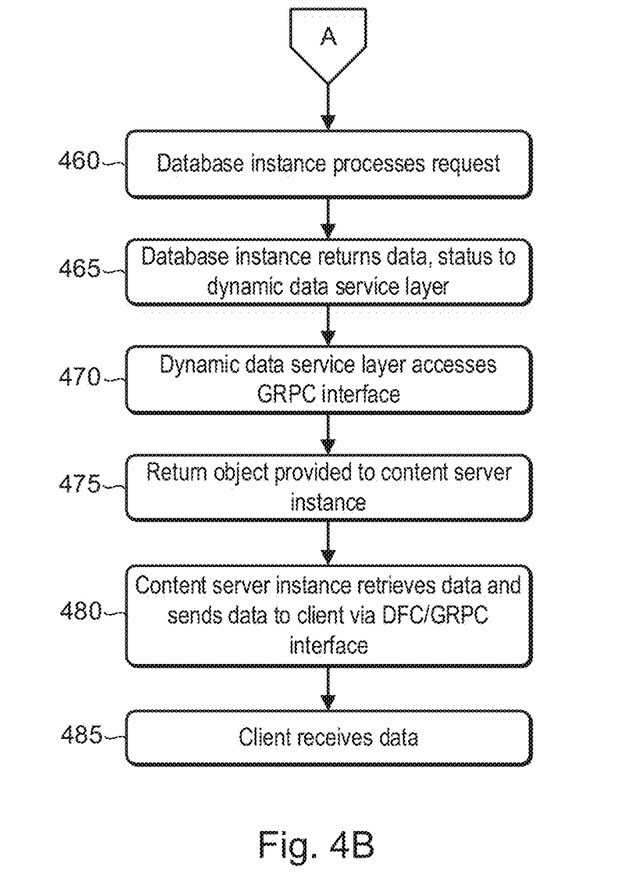

Referring to FIGS. 4A and 4B, a flow diagram illustrating an alternative perspective of the operation of the dynamic data service layer is shown. As depicted in these figures, a request is initiated by a software application such as a content management application (400). The application accesses an interface layer that utilizes DFCs, GRPCs or a similar interface mechanism (405) and passes a service request to a content server instance in a content server layer of the system (410). The content server instance operates on the request from the application and in turn generates a request that is provided to a GRPC interface (415), which in turn forwards the request to the dynamic data service layer. The dynamic data service engine attempts to validate the request (420) and, if the request is valid, it searches a routing list of available database instances in the instance pool to find a suitable database instance to service the request (425).

If the dynamic data service engine cannot identify a suitable database instance, the dynamic data service engine makes a call to the dynamic data search engine (450) to update the routing list. Upon successfully completing the update of the routing table, the dynamic data service engine again searches the routing list to identify a database instance to service the request (425). If a suitable database instance still cannot be identified, the dynamic data service engine again accesses the data search engine to trigger an update of all of the routing, instance and service/connection tables and pools.

If a suitable database instance can be identified, the dynamic data service engine gets the details of the identified database instance and then accesses the connection list from the service/connection pool (430). If the dynamic data service engine cannot identify an available connection in the connection list, the dynamic data service engine makes a call to the dynamic data search engine (450) to update the list and again searches for a connection (430) upon completion of the update. If the dynamic data service engine can find an available connection for the identified database instance, it determines whether the available connections for the database instance comprise a predetermined (user-configurable) percentage of the connection pool (435). If so, additional connections are added to the system and the data search engine is accessed (450) to dynamically update the instance pool/list and the connection pool/list. If there is any failure during the addition of new connections, a notification is sent to the dynamic data service engine.

If the dynamic data service engine can identify a suitable database instance and connection from the instance pool and connection pool, the health of the instance and the connection are validated (440). The health of each database instance is monitored continuously in this embodiment through a health monitor. The health monitor checks the health of the database instances at regular time intervals and updates the data service engine with the health status (455). If the health of the instance and the connection are successfully validated, the request is allocated to the identified connection of the database instance in order to process and execute the request on the database instance (445).

After the database instance has processed and executed the request (460), a result object is created, and this object is provided to the dynamic data service engine (465). In one embodiment, a data result is generated by the database instance and stored in a memory location. The result object provided to the dynamic data service engine includes a memory address which indicates the starting address of the data result in the memory, and a length of the stored data result. The result object also includes a status of the database instance, as well as any error messages that are generated by the database instance. The dynamic data service engine accesses the GRPC interface (470) and forwards the result object to the content server instance (475). The content server instance in turn reads the data result from the memory using the provided starting address and length, and then accesses the DFC/GRPC interface to the client (480) and uses this interface to forward the data result to the client (485).

Figure 5:
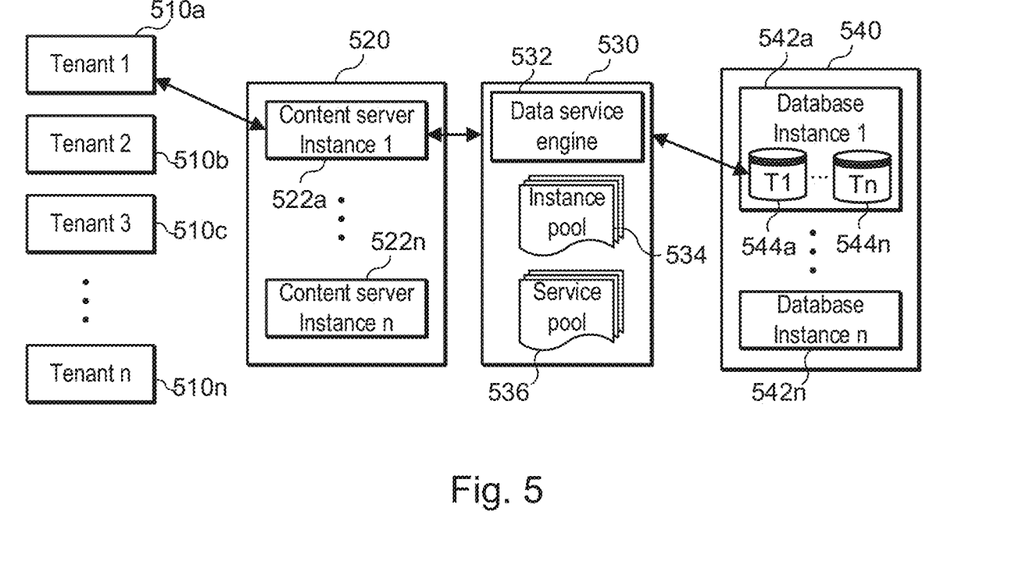
FIG. 5 is a diagram illustrating a multitenant model using a dynamic data service engine in accordance with some embodiments.

As noted above, the present systems and methods can be implemented in a multitenant environment. FIG. 5 is a diagram illustrating a multitenant model using a dynamic data service engine in accordance with some embodiments. As depicted in this figure, the system has multiple tenants 510. Each of these tenants can access a content server layer 520 that includes multiple content server instances 522. A request from any individual one of the tenants 510 is forwarded to content server layer 520, where it may be handled by any available one of content server instances 522. The content server instance that receives the request will access the dynamic data service layer 530, which includes dynamic data service engine 532, instance pool 534 and connection pool 536.

Upon receiving the request from the content server instance, dynamic data service engine 532 will examine the list of available database instances in instance pool 534 to select an available one of the database instances. The identified database instance may be one that is dedicated to the tenant that initiated the request, or it may include data for multiple tenants (in which case a tenant identifier in the request will be used to access the data associated with the tenant). Dynamic data service engine 532 will then examine connection pool 536 to identify an available connection for the selected database instance. Using the details from the instance pool and connection pool, the dynamic data service engine will forward the request to the identified database instance 542 within database layer 540. Database instance 542 contains one or more database tables 544, at least one of which corresponds to the requested tenant data.

When the request is received by the selected database instance 542, the request is processed and executed. Execution of the request may generate responsive data which may be stored in a memory. The database instance may then generate a return object which includes an address at which the data is stored in the memory, a length of the stored data in the memory, a status of the database instance, and any error messages generated by the database instance. This return object is provided to dynamic data service engine 532, which in turn provides the return object to the content server instance. The content server instance then provides the return object to the one of the tenants that generated the request, so that the tenant can read the responsive data stored in the memory (using the address and length contained in the return object).

Using this model, the data requests of different tenants would be shared across the content server layer and could be handled by multiple content server instances within this layer. Similarly, the requests of the different tenants could be serviced by multiple database instances within the database layer. This model also allows the different tenants to communicate with different types of databases. These features would allow the system to share the load of the requests from the different tenants across multiple content server instances and database instances to provide high availability of resources and servicing the requests. This multitenant model is easily maintainable and can be migrated to a micro service architecture in any suitable environment, including cloud-based environments.

Embodiments of the technology may be implemented on a computing system. Any combination of mobile desktop, server machine, embedded or other types of hardware may be used. One exemplary embodiment may be implemented in a distributed network computing environment. The computing environment in this embodiment includes a client computer system and a server computer system connected to a network (e.g., a local area network (LAN), a wide area network (WAN) such as the Internet, mobile network, or other type of network or combination thereof). The network may represent a combination of wired and wireless networks that network computing environment may utilize for various types of network communications.

The client computer system may include, for example, a computer processor and associated memory. The computer processor may be an integrated circuit for processing instructions, such as, but not limited to a CPU. For example, the processor may comprise one or more cores or micro-cores of a processor. The memory may include volatile memory, non-volatile memory, semi-volatile memory or a combination thereof. The memory, for example, may include RAM, ROM, flash memory, a hard disk drive, a solid-state drive, an optical storage medium (e.g., CD-ROM), or other computer readable memory or combination thereof. The memory may implement a storage hierarchy that includes cache memory, primary memory or secondary memory. In some embodiments, the memory may include storage space on a data storage array. The client computer system may also include input/output ("I/O") devices, such as a keyboard, monitor, printer, electronic pointing device (e.g., mouse, trackball, stylus, etc.), or the like. The client computer system may also include a communication interface, such as a network interface card, to interface with the network.

The memory may store instructions executable by the processor. For example, the memory may include an operating system, a page editing or processing program (e.g., a web browser or other program capable of rendering pages) and a server program configured to extend the functionality of the page processing program. Further, the memory may be configured with a page processable (e.g., capable of being rendered by) by the page editing program. The page may be the local representation of a page, such as a web page, retrieved from the network environment. As will be appreciated, while rendering the page, the page editing/processing program may request related resources, such as style sheets, image files, video files, audio files and other related resources as the page is being rendered and thus, code and other resources of the page may be added to the page as it is being rendered.

The server computer system may include, for example, a computer processor and associated memory. The computer processor may be an integrated circuit for processing instructions. For example, the processor may comprise one or more cores or micro-cores of a processor. The processor may comprise a CPU. The memory may include volatile memory, non-volatile memory, semi-volatile memory or a combination thereof. The memory, for example, may include RAM, ROM, flash memory, a hard disk drive, a solid state drive, an optical storage medium (e.g., CD-ROM), or other computer readable memory or combination thereof. The memory may implement a storage hierarchy that includes cache memory, primary memory or secondary memory. In some embodiments, the memory may include storage space on a data storage array. Server computer system 830 may also include I/O devices. The server computer system may also include a communication interface, such as a network interface card, to interface with the network.

The memory may store instructions executable by the processor. For example, the memory may include an operating system and application server code. The application server code can be executable to receive requests from client computers, such as the client computer system, generate or server page files from a set of page assets (e.g., complete web pages, page fragments, scripts or other assets) and return page files in response. A page file may reference additional resources, such as style sheets, images, videos, audio, scripts or other resources at the server computer system or at other network locations, such as at additional server systems.

According to one embodiment, the network environment may be configured with a page such as a web page which is configured to launch and connect to an instance of the server program. The page may include a page file containing page code (HTML or other markup language, scripts or code), stored or generated by the server computer system, that references resources at the server computer system or other network locations, such as additional server computer systems. The page file or related resources may include scripts or other code executable to launch and connect to an instance of the server program.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any, hardware system, hardware mechanism or hardware component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system comprising:
   a content server layer, wherein the content server layer includes one or more content server instances;
   a database layer that includes one or more database instances, wherein the one or more database instances have one or more database types; and
   a dynamic data service layer coupled between the content server layer and the database layer, the dynamic data service layer comprising a processor and a memory, wherein the dynamic data service layer is configured to:
   monitor the database layer, identify database types which are available in the database layer, and maintain an instance pool data structure that identifies database instances which are available in the database layer,
   identify, for each of the database instances which are identified in the instance pool data structure, corresponding connections which are available to the database instance,
   receive a request for service from the content server layer, select from the available database instances of the available database types identified in the instance pool data structure and the connection pool data structure one of the available database instances that is capable of servicing the request, and access the selected database instance to service the request,
   receive from the first one of the database instances data responsive to the request;
   store the responsive data at a first memory location; and
   provide to the first one of the content server instances, responsive to the request, a starting address of the first memory location and a length of the responsive data, wherein the responsive data is retrievable by the first one of the content server instances from the memory location using the provided starting address and length.

2. The system of claim 1, wherein:
   the selected database instance provides data responsive to the request, wherein the responsive data is stored at a first memory location, wherein the dynamic data service layer provides to the content server layer a starting address of the first memory location and a length of the responsive data; and
   the content server layer retrieves the responsive data from the memory location using the provided starting address and length.

3. The system of claim 2, wherein the selected database instance further providing, responsive to the request, a status of the selected database instance and any errors generated by the selected database instance during servicing of the request.

4. The system of claim 1, wherein the dynamic data service layer is configured to enable modification of the instance pool and the connection pool at runtime and thereby dynamically enable addition and deletion of database instances and connections at runtime.

5. The system of claim 1, wherein the dynamic data service layer comprises a dynamic data service engine and a data service search engine, wherein the data service search engine is configured to determine availability of database instances and connections for each of the database instances, and to maintain the instance pool and the connection pool.

6. The system of claim 5, wherein the dynamic data service layer further comprises a health monitor, wherein the health monitor is configured to monitor a health of the database instances in the instance pool and connections in the connection pool, and to communicate the health of the database instances in the instance pool and connections in the connection pool to the data service search engine.

7. The system of claim 1, wherein the dynamic data service layer is configured to:

receive the request;
identify from the request a corresponding database type that is capable of servicing the request;
determine whether the instance pool contains one or more database instances of the corresponding database type; and
in response to determining that the instance pool contains one or more database instances of the corresponding database type, identifying a first one of the one or more database instance of the corresponding database type as the selected database instance.

8. The system of claim 1, wherein the dynamic data service layer is configured to:
identify an application that initiated the request; and
identify a corresponding database type that is capable of servicing requests from the identified application.

9. The system of claim 1, wherein the dynamic data service layer is configured to determine a status of each database instance included in the instance pool.

10. The system of claim 9, wherein the dynamic data service layer is configured to select the one of the available database instances based at least in part in dependence upon the status of one or more database instances included in the instance pool.

11. The system of claim 1, wherein the dynamic data service layer is configured to determine a load corresponding to each database instance included in the instance pool.

12. The system of claim 11, wherein the dynamic data service layer is configured to select the one of the available database instances based at least in part in dependence upon the loads of one or more database instances included in the instance pool.

13. A method for dynamically enabling communication between content server instances and database instances, the method comprising:
executing one or more content server instances in a content server layer;
executing one or more database instances in a database layer; and
executing a dynamic data service layer, including
maintaining an instance pool that identifies available ones of the database instances,
maintaining a connection pool that identifies available connections to the database instances identified in the instance pool,
receiving a request from a first one of the content server instances,
identifying a first one of the database instances in the instance pool which is available to service the request,
identifying, in the connection pool, a first one of the connections corresponding to the first one of the database instances which is available for servicing the request, and
accessing the first one of the database instances using the first one of the connections and providing the request to the first one of the database instances to be serviced;
receiving from the first one of the database instances data responsive to the request;
storing the responsive data at a first memory location; and
providing to the first one of the content server instances, responsive to the request, a startinq address of the first memory location and a length of the responsive data, wherein the responsive data is retrievable by the first one of the content server instances from the memory location using the provided starting address and length.

14. The method of claim 13, further comprising, at runtime, modifying one or more of the database instances in the instance pool or the connections in the connection pool and thereby dynamically modifying one or more connections to one or more database instances that are available to the one or more content server instances in the content server layer.

15. The method of claim 13, further comprising determining loads corresponding to the database instances in the instance pool and identifying the first one of the database instances at least partially in dependence upon the corresponding load.

16. A computer program product for dynamically enabling communication between content server instances and database instances, the computer program product comprising a non-transitory computer-readable medium storing instructions executable by one or more processors to cause the processors to perform:
executing one or more content server instances in a content server layer;
executing one or more database instances in a database layer; and
executing a dynamic data service layer, including
maintaining an instance pool that identifies available ones of the database instances,
maintaining a connection pool that identifies available connections to the database instances identified in the instance pool,
receiving a request from a first one of the content server instances,
identifying a first one of the database instances in the instance pool which is available to service the request,
identifying, in the connection pool, a first one of the connections corresponding to the first one of the database instances which is available for servicing the request, and
accessing the first one of the database instances using the first one of the connections and providing the request to the first one of the database instances to be serviced;
receiving from the first one of the database instances data responsive to the request;
storing the responsive data at a first memory location; and
providing to the first one of the content server instances, responsive to the request, a startinq address of the first memory location and a length of the responsive data, wherein the responsive data is retrievable by the first one of the content server instances from the memory location using the provided starting address and length.

17. The computer program product of claim 16, wherein the instructions are further executable by the one or more processors to cause the processors to perform:
modifying, at runtime, one or more of the database instances in the instance pool or the connections in the connection pool and thereby dynamically modifying one or more connections to one or more database instances that are available to the one or more content server instances in the content server layer.

18. The computer program product of claim 16, wherein the instructions are further executable by the one or more processors to cause the processors to perform:
determining loads corresponding to the database instances in the instance pool and identifying the first one of the database instances at least partially in dependence upon the corresponding load.

* * * * *